(12) United States Patent
Friss et al.

(10) Patent No.: US 7,797,194 B1
(45) Date of Patent: Sep. 14, 2010

(54) METHOD AND APPARATUS FOR OFFERING FOR SALE COLLECTIBLES ON PRIMARY AND SECONDARY MARKETS

(75) Inventors: Warren E. Friss, Westfield, NJ (US); Steven J. Katz, Port Washington, NY (US)

(73) Assignee: The Topps Company, Inc., New York, NY (US)

( * ) Notice: Subject to any disclaimer, the term of this patent is extended or adjusted under 35 U.S.C. 154(b) by 0 days.

(21) Appl. No.: 09/488,107

(22) Filed: Jan. 20, 2000

(51) Int. Cl.
*G06Q 40/00* (2006.01)

(52) U.S. Cl. .......................... 705/26; 705/27

(58) Field of Classification Search ............ 705/27, 705/36, 37, 26
See application file for complete search history.

(56) References Cited

U.S. PATENT DOCUMENTS

| | | | | |
|---|---|---|---|---|
| 4,322,001 A | * | 3/1982 | Hurley | 206/449 |
| 4,903,201 A | | 2/1990 | Wagner | |
| 5,465,291 A | * | 11/1995 | Barrus et al. | 379/67 |
| 5,557,518 A | * | 9/1996 | Rosen | 364/408 |
| 5,794,207 A | | 8/1998 | Walker et al. | |
| 5,845,265 A | * | 12/1998 | Woolston | 705/37 |
| 5,873,071 A | * | 2/1999 | Ferstenberg et al. | 705/36 |
| 5,983,200 A | * | 11/1999 | Slotznick | 705/26 |
| 6,085,176 A | * | 7/2000 | Woolston | 705/37 |
| 6,108,639 A | * | 8/2000 | Walker et al. | 705/26 |
| 6,119,229 A | * | 9/2000 | Martinez et al. | 713/200 |
| 6,141,006 A | * | 10/2000 | Knowlton et al. | 345/335 |
| 6,167,380 A | * | 12/2000 | Kenndedy et al. | 705/10 |
| 6,266,651 B1 | * | 7/2001 | Woolston | 705/27 |
| 6,606,608 B1 | * | 8/2003 | Bezos et al. | 705/36 R |
| 7,558,752 B1 | * | 7/2009 | Ephrati et al. | 705/37 |

OTHER PUBLICATIONS

"Don't Toss Away Those Cards"; Card Technology, p. 38, May 1997.*
Obrien et al.; "An Introduction to the Collectable Sportscard Market"; Managerial Finance, V. 21, No. 6, 1995.*
Schlosberg J; "Lessons in Surviving Successfully"; Varbusiness, Nov. 1993.*

(Continued)

*Primary Examiner*—Jagdish N Patel
(74) *Attorney, Agent, or Firm*—Mark Montague; Cowan, Liebowitz & Latman, P.C.

(57) ABSTRACT

A method of preparing a server is disclosed that supports a plurality of purchaser systems to transmit over the Internet orders for collectibles being offered for sale on a primary and a secondary market. The method starts by constructing at the server a purchaser history database. Then, an initial placement of a number of lots of selected collectibles are offered for sale on the primary market. Next an account is created for each purchaser transmitting an order to the server. Each account includes a record of the purchasing activity of its purchasers. Then, the lots of selected collectibles are allocated to the successful purchasers. Then at the direction of certain of the successful purchasers, selected of the allocated collectibles are offered for sale on the secondary market. Orders are received from all of the purchasers who placed orders during the offering for sale of the primary market and the offering for sale on the secondary market, and a record for each of the purchasers is created in the purchaser history database. The collectibles may comprise trading cards.

58 Claims, 7 Drawing Sheets

OTHER PUBLICATIONS

Sweeny et al.; "Bartering"; Business Credit; vol. 94, Iss 7, p. 33, May 1997.*

"The Railroad Telegraph", Off the wire Feb. 24, 1999.*

"The Stock Exchange of Hong Kong Limited", Practice Note 18, Jun. 1998. (hereafter referred to as "The Stock Exchange").*

"How to Sell Your Wares At Online Auctions—Give Some Thought to This High-Tech Opportunity to Earn Cash", Link-up, v.16, n.6, p. 27, Nov. 1, 1999.

"A Baseball Card Seller Finds Vertical Auctions Outdo eBay"; Internet World, v.5, n.19, p. 49, May 17, 1999.

"Hasbro Holds On-Line Auction for Collectibles"; Providence Journal-Bulletin, p. F.01, Nov. 12, 1998.

"Auctioneer Ready for Public Time?"; Interactive Week, vol. 5, No. 5, p. 53, Feb. 9, 1998.

* cited by examiner

METHOD AND APPARATUS FOR OFFERING FOR SALE COLLECTIBLES ON PRIMARY AND SECONDARY MARKETS

FIELD OF THE INVENTION

This invention relates to the offering for sale of collectibles. In one illustrative embodiment of this invention, the collectibles take the form of trading cards and, in particular, those cards that bear the images of athletes. The offering for sale is implemented by a computerized data processing system and, in one embodiment of this invention, is implemented as a web site on the Internet. The offering for sale according to this invention operates on the potential appreciation of collectibles. In the context of trading cards depicting athletes, whether a particular card will appreciate depends, in part, on whether the depicted player will have a successful career. This invention permits purchasers to buy a number of collectibles at a given time, and then permits the purchaser to resell the collectible at some later time.

BACKGROUND OF THE INVENTION

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote purchaser computer system. The remote purchaser computer system can then display the Web pages. Each resource (e.g., computer or Web page) of the WWW is uniquely identifiable by a Uniform Resource Locator ("URL"). To view a specific Web page, a purchaser computer system specifies the URL for that Web page in a request (e.g., a HyperText Transfer Protocol ("HTTP") request). The request is forwarded to the Web server that supports that Web page. When the Web server receives the request, it sends that Web page to the purchaser computer system. When the purchaser computer system receives that Web page, it typically displays the Web page using a browser. A browser is a special-purpose application program that effects the requesting of Web pages and the displaying of Web pages.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the purchaser computer system an HTML document that defines the Web page. When the requested HTML document is received by the purchaser computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to conducting electronic commerce. Web Servers have been programmed to permit vendors to provide a wide array of products and services for sale over the Internet. A user, who is a potential purchaser, may browse one or more web sites, which provide lists of products or services for sale, much like a catalogue. A purchaser may preview these lists to select a desired product or services to be purchased. When the user has completed selecting the items to be purchased, the server computer system then prompts the user to enter information to complete the ordering of the selected items. This purchase generally deals with how and where the selected items may be delivered to the purchaser and how the purchaser will pay for the selected items.

There are dozens of different buyer-seller protocols in use today. However, almost all of those systems are seller-driven in the sense that they focus on the methods and processes available to the seller, allowing him/her to price, package or configure goods and services more effectively. Stores, catalogs, classified advertisements, telemarketing, offering for sale houses, even on-line computerized reservation systems such as SABRE, are all seller-driven. Traditionally, it is the seller's job to attract buyers and then to complete the sale. Thus, in a seller-driven system, the advertising cost of the transaction and the attendant risks that such advertising will be unsuccessful falls upon the seller.

Most goods and services purchased at retail are done so using a general seller-driven protocol whereby the seller sets a price and the buyer decides whether or not to accept that price. Prices for some services, such as airline tickets, might change frequently, but the buyer must still wait for the seller to offer a price he finds acceptable. Obviously, some forms of commerce offer far more give and take with offers and counteroffers being exchanged, however the vast majority of retail purchases utilize seller-driven, fixed-price, non-negotiable pricing protocols.

Auctions are probably the most frequently used system whereby prices are not fixed by the seller. Here too, the system is seller-driven. The buyer does not find the seller, rather the seller attracts numerous buyers who, as a group, determine the final selling price—which the seller may subsequently reject unless the item offered for sale is being purchased without a reserve.

Even on-line reservation systems are seller-driven. Airline reservation systems such as SABRE are in the business of constantly posting airfares. Travel agents and consumers are on the order for side of the process. However, since they cannot communicate their orders to the airlines, they must wait until an "asked" fare is quoted which meets their needs.

Other commerce systems are exchange-driven. These systems, such as NASDAQ or the New York Stock Exchange (NYSE), match buyers and sellers by offering an efficient, fair and orderly marketplace. They favor neither buyers nor sellers, but simply effectuate communications that allow for the matching process to take place. An example of an automated exchange-driven commerce system for trading futures is disclosed in U.S. Pat. No. 4,903,201.

The protocol adopted by this invention resembles that of an initial public offering (IPO), wherein a lot of securities are offered at a fixed price during a window of offering for sale. In this window, purchasers place orders for a given number shares of the offered security. In the stock market, an investor believing that a particular security will appreciate, may order a lot of the offered security, perhaps 1,000 or 10,000 share. If the judgement of the investor was correct and the stock appreciates, then the investor would realize a significant financial gain. Often due to the demand for the security, a purchaser is not allocated the requested number of securities. Rather, the broker, in an attempt to satisfy as many of his/her clients as possible, reduces the number of stocks and allocates them in accordance with the well-known algorithm, i.e., rewarding his/her best clients with the most shares. After the initial offering, the broker may escrow the shares of a particular client, if the client decides not to hold the shares personally. At a later time, the client who purchased these shares will sell on a secondary market, often through his/her broker, the shares originally purchased on the primary market.

This invention contemplates that collectibles and, in particular that athlete trading cards may be treated in a similar way. For example, if you believe that Derek Jeter will become the best shortstop of all time, then the purchaser would want to obtain a number of his cards. Presently, athletic trading cards are purchased on the primary market in packs. A pack includes a number of cards, each of which is different from the others. Each pack is typically wrapped so that the purchaser can not tell what cards are in a particular pack. If the potential purchaser would seek to obtain a number of Derek Jeter cards, he/she would need to purchase a number of packs and, even then, would not be assured of finding any Derek Jeter cards. The purchaser could also go to a secondary market and start buying Derek Jeter cards. Even in the secondary market, e.g., stores or web sites that specialize in the sale of trading cards, the investor is only likely to secure one Derek Jeter card at a time. In accordance with this invention, lots of a single desired cards will be efficiently offered for sale to the purchaser.

SUMMARY

Accordingly, it is an object of this invention to provide a computerized data processing system for creating a primary market for collectibles.

It is one object of this invention to provide a computerized data processing system for the managing of the offering for sale of collectibles on primary and secondary markets.

It is a further object of this invention to not only manage the offering for sale of collectibles, but also to keep track of the potential purchasers who input orders to this data processing system.

It is a still further object of this invention to create a record for each purchaser for storing data indicative of the orders they placed, the number and identification of the collectibles or lots of collectibles that each purchaser has bought, and the number of collectibles held in escrow for each purchaser.

It is another object of this invention to provide a data processing system for receiving orders from a plurality of purchasers, each order including the number and kind of collectibles sought to be purchased, processing the orders to determine the number of collectibles and in the case that the demand for a collectible of a certain kind exceeds the demand, allocating the available collectibles to the purchasers in accordance with a predefined algorithm.

It is a still further object of this invention to provide a data processing system for managing the offering for sale of collectibles in one illustrative embodiment of this invention that is implemented on a web site of the Internet, whereby potential purchasers can readily place orders to and receive messages from the web site as to the status of their orders.

In accordance with these and other objects of the invention, this invention provides a method of preparing a server to support a plurality of purchaser systems to transmit over the Internet orders for collectibles being offered for sale on a primary market and a secondary market. The method starts by constructing at the server a purchaser history database. Then, an initial placement of a number of lots of selected collectibles are offered for sale on a primary market. Next an account is created for each purchaser transmitting an order to the server. Each account includes a record of the purchasing activity of its purchaser. Then, the lots of selected collectibles are allocated to the successful purchasers. At the direction of certain of the successful purchasers, selected of the allocated collectibles are offered for sale on a secondary market.

In one illustrative embodiment of this invention, purchasers place orders during the offering for sale on the primary market and the offering for sale on the secondary market, and a record at least for each of the purchasers during the offering for sale on the primary market is created in the purchaser history database.

In a further aspect of this invention, this invention provides a method of operating a programmed computer for offering for sale collectibles on a primary market and a secondary market. The method offers for sale an initial placement of a number of lots of selected collectibles on a primary market. Each lot is comprised of one kind of collectible. Next, orders are received from prospective purchasers on the lots of selected collectibles, and the lots of selected collectibles are allocated to certain successful purchasers. Next, at the direction of certain of the successful purchasers, selected of the allocated collectibles are offered for sale on a secondary market.

In another aspect of this invention, the number of collectibles of one kind to be offered for sale on the primary market are limited.

In a still further aspect of this invention, the collectibles comprise trading cards.

In a further feature of this invention, a server is designed to support a plurality of purchaser systems to transmit over the Internet to the server orders for selected collectibles being offered for sale on a primary market and a secondary market. The server comprises a server engine and a purchaser history database. The server engine is programmed to implement a offering for sale of an initial placement of collectibles on a primary market and an offering for sale on the secondary market of the collectibles purchased during the offering for sale on the primary market. The purchaser history database keeps a record of at least each purchaser that places orders during the offering for sale on the primary market.

In a further aspect of this invention, the server engine is programmed to respond to orders from certain of the successful purchasers to place selected of their collectibles that were purchased on the primary market in escrow, by updating the record of a certain successful purchaser with data indicative of the collectibles held in escrow.

BRIEF DESCRIPTION OF THE DRAWINGS

The forgoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF A PREFERRED EMBODIMENT OF THE INVENTION

Figure 1:
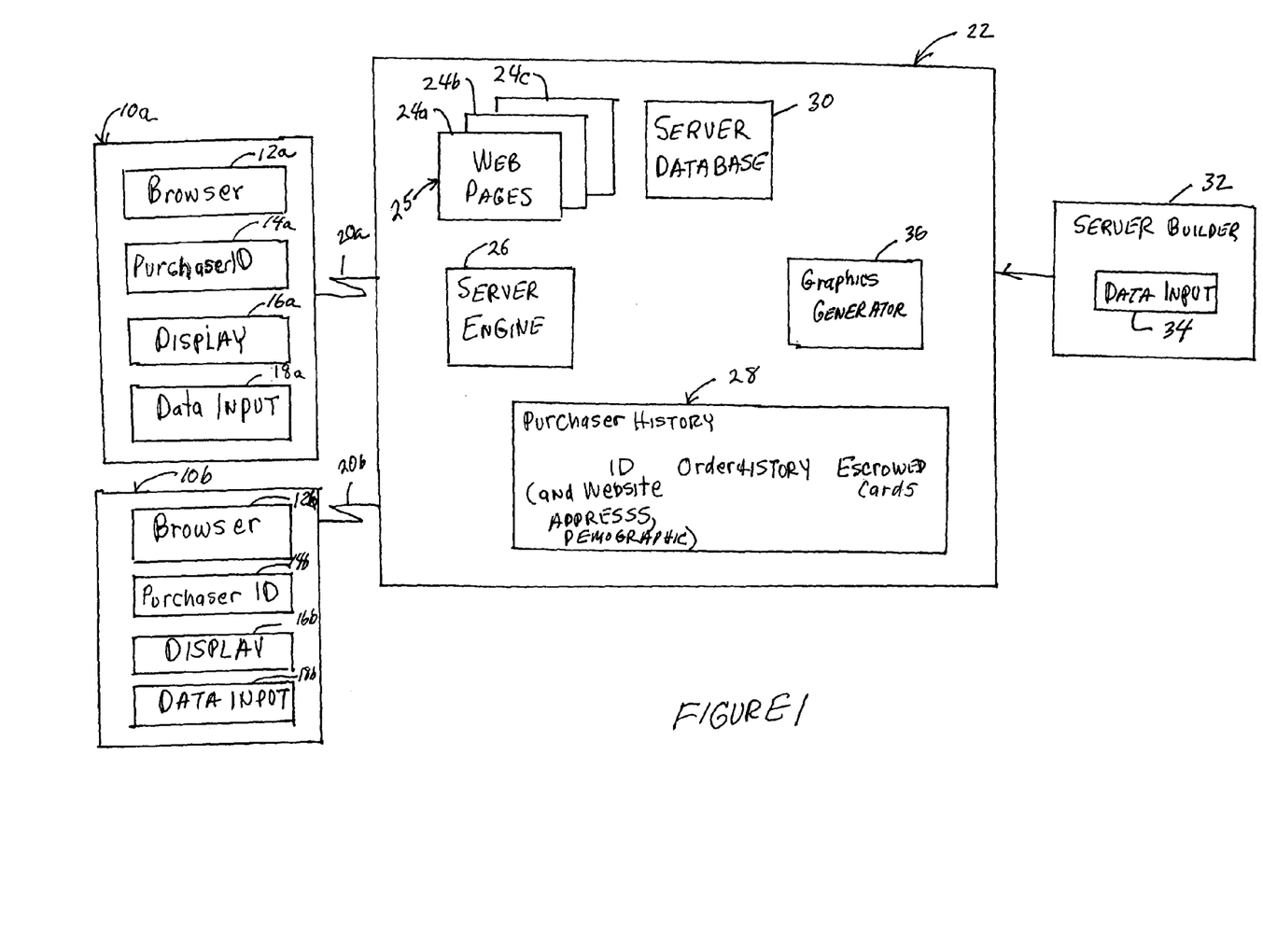
FIG. 1 is a functional block diagram illustrating how a plurality of purchasers' systems or terminals and a server system for a web site to be accessed are connected to and by a communication link to each other.

Referring now to the drawings and in particular to FIG. 1, there is shown an embodiment of this invention which permits a purchaser or user, using his/her purchaser system 10 to access a server system 22 by exchanging messages over a communication link 20, which in one example of this invention may take the form of the Internet. The purchaser system 10 comprises a browser 12 and its assigned purchaser identifier, which is known as a "cookie". The purchaser identifier is stored in a file 14. Though only a pair of purchaser systems 10 is illustrated in FIG. 1, it will be appreciated that there would typically be two or more purchaser systems 10a, 10b-10n, which are connected to the communication links 20a and b and are capable of transmitting messages over the links 20 to the server system 22. Each of the purchaser systems 10a, b-n further includes a display 16 for presenting a webpage 24 to the purchaser or user, and a data input device 18 such as a keyboard or other device well known to those skilled in the art. The webpage 24 is downloaded from the server system 22 to implement an offering for sale, as will be explained below. In one embodiment of this invention, the purchaser initiates on the browser 12 a communication session with the server system 22 by assigning and sending over the link 20 a message bearing an order for a collectable that is being offered for sale, along with his/her purchaser identifier to the purchaser system 10. From then on, the purchaser system 10 includes its purchaser identifier with all messages sent to the server system 22 so that the server system 22 can identify the particular purchaser system 10 from which the message was originally sent.

The server system 22 comprises, as shown in FIG. 1, a server engine 26, a database 25 for storing the webpages 24a, b and c, a server data base 30 and a purchaser history 28. As is well known in the art, the server engine 26 processes the purchaser messages that were transmitted from the browser over the links 20 in the form of HTTP requests to access webpages 24a, b, and c identified by URLs and, in turn, transmits the requested webpages 24 to the requesting purchaser system 10, where the webpages 24 are presented on the display 16 of the requesting purchaser system 10.

Figure 2A:
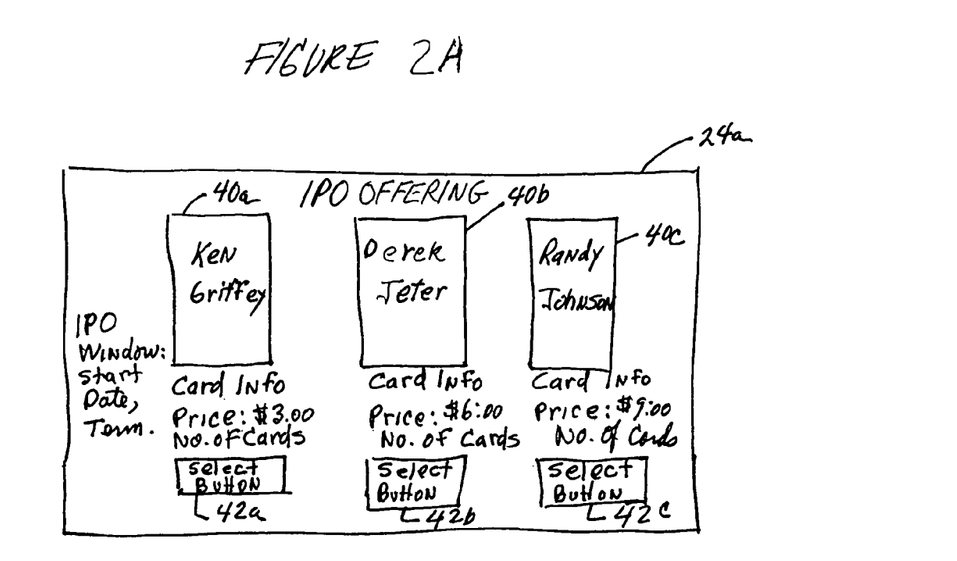
FIGS. 2A and 2B illustrate a plurality of screens or webpages that are downloaded from the server system to appear on a display of the purchasers' systems to variously present the collectibles, e.g., trading cards, that are being offered for sale.
Figure 2B:
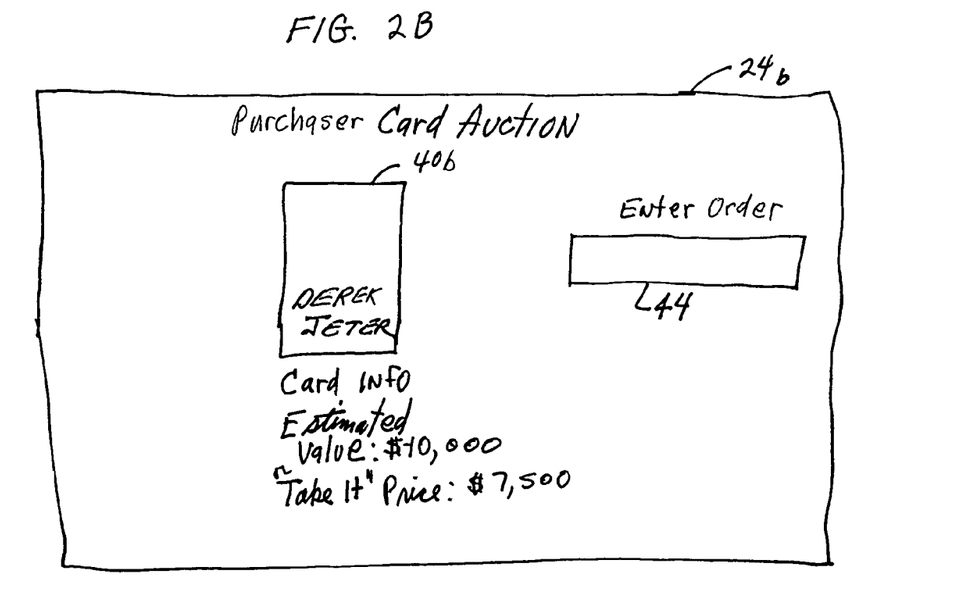

The server system 22 is front ended, as described above, in that a purchaser can access the system 22 by sending requests from the browser 12 via the communication link 20 to the server system 22, while data in the form of images of the different collectibles 40, as shown in FIGS. 2A and B, are back ended, i.e., this data is input to the server system 22 from a server builder 32. The server builder 32 includes a data input device 34, which permits the offering for a purchasing administrator to input data, e.g., the images of the collectibles, to the server system 22 and, in particular to a graphics generator 36.

The generator 36 in turn creates in a manner well known in the art the webpages 24 that are stored in the webpage database 25.

Referring now to FIGS. 2A and B, there are shown web pages 24a and b, which are used in accordance with the teachings of this invention to carry out an offering for sale in the nature of an initial public offering (IPO). Such IPO's are well known methods of offering for sale an initial offering of securities. The web page 24a bears the images of three collectibles 40a, b and c. Though a variety of other collectibles could be offered for sale in accordance with the teachings of this invention, an illustrative embodiment of this invention is implemented by trading cards and, in particular, those trading cards that bear the likeness of athletes. For example, the collectibles 40a, b and c bear the images of well-known baseball players such as Ken Griffey, Derek Jeter and Randy Johnson, respectively.

Still referring to FIG. 2A, the webpage 24a has been particularly constructed to be used as a part an offering for sale to be carried out in accordance with the teachings of this invention. In particular, the webpage 24a bears data describing the card, e.g., information about the athlete portrayed, the price to be charged for that card, the number of cards being issued, the date when the window for entering orders will start and the length of that window. In addition, a select button 42 is embedded in the web page 24a for each of the cards 40a, 40b and 40c. When the time comes in the course of this offering for sale, the purchaser will click that button 42 in accordance with the card 40 that is selected, e.g., the purchaser will click on button 42b to choose the Derek Jeter card 40b.

This invention also relates, as will be described below, to the creation of a secondary market for its purchasers who have acquired a lot of a certain card 40. If for example, the purchaser wants to sell one of his/her Derek Jeter cards 40b, he/she may readily do that by authorizing the offering for the purchasing administrator to place that card into an offering for sale, wherein the Derek Jeter care 40b may be purchased. In particular the webpage 24b will bear an image of the Derek Jeter card 40b and additionally bear information about this card including its estimated value, the card's "Take It" price and an enter order for box 44, wherein a purchaser may enter a price for the card 40b. As will be explained below, the "Take It" price is that price at which the card holder has previously agreed to sell the card 40.

Figure 3:
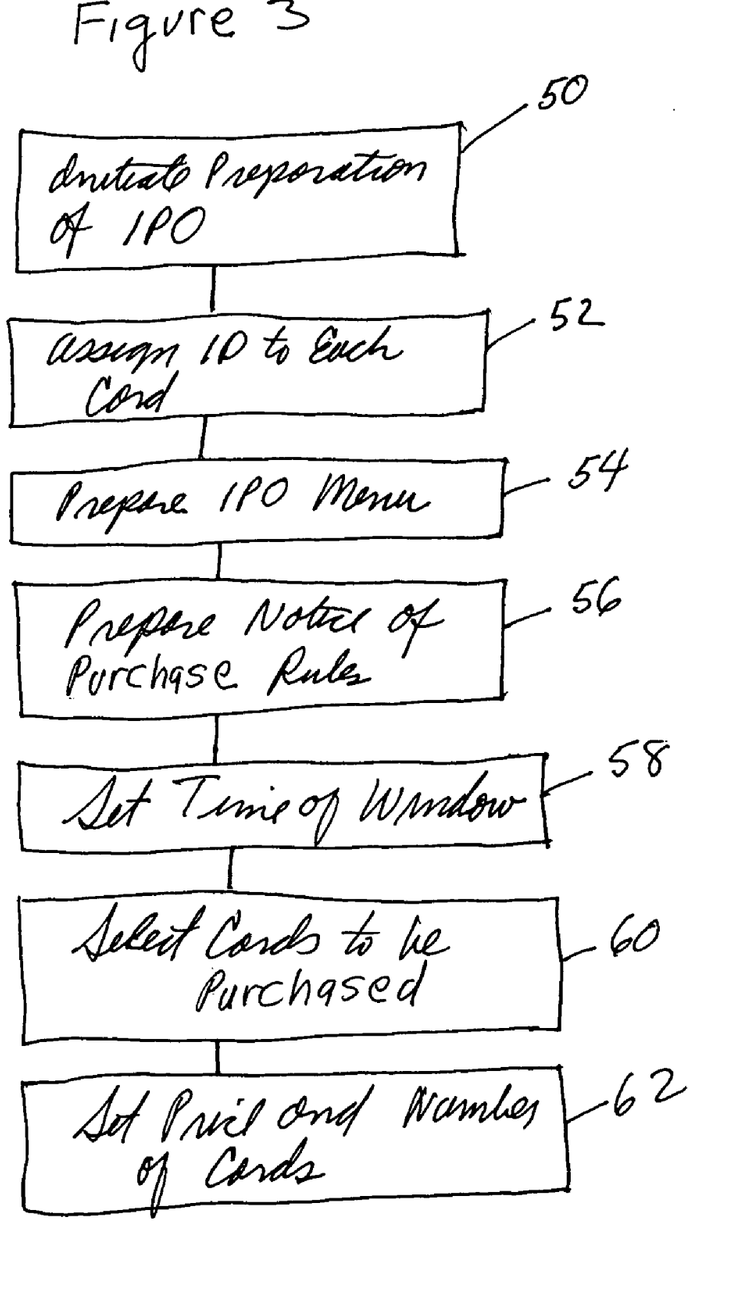
FIG. 3 is a flow diagram of a program, which is loaded on the server system to permit an offering for sale administrator to build an Initial Player Offering, whereby a plurality of selected collectibles may be offered for sale.

Referring now to FIG. 3, there is shown a flow chart of a program which helps the purchasing administrator to construct an Initial Player Offering for sale in accordance with the teachings of this invention. This program is stored in the server database 30 and is executed by the server engine 26. After initiating in step 50 the preparation of the Initial Player Offering for sale, step 52 prompts the administrator to enter via the data input 34 of the server builder 34 an ID number that uniquely identifies each card or collectable 40 and at least some of the important attributes of that collectable 40, e.g., the name of the athlete portrayed on the card 40, its price, its "Take It" price and the expected number of cards 40 to be offered for sale. Next in step 54, an Initial Player Offering menu appears that helps the administrator to enter selected data on and to prepare the webpages 24. In step 56, the administrator prepares via the data input 34 a webpage 24c (not shown) that sets out the rules under which the Initial Player Offering for sale will be conducted. Next in step 58, the duration of the time window during which the Initial Player Offering for sale will be conducted is entered by the administrator. Next in step 60, the administrator selects via the data input 34 the ID numbers of the collectibles 40, e.g., trading cards, to be included within the Initial Player Offering for sale. Finally, the price and number of the collectibles 40 to be included in the offering for sale are set by the purchasing administrator using the input 34 in step 62.

Figure 4:
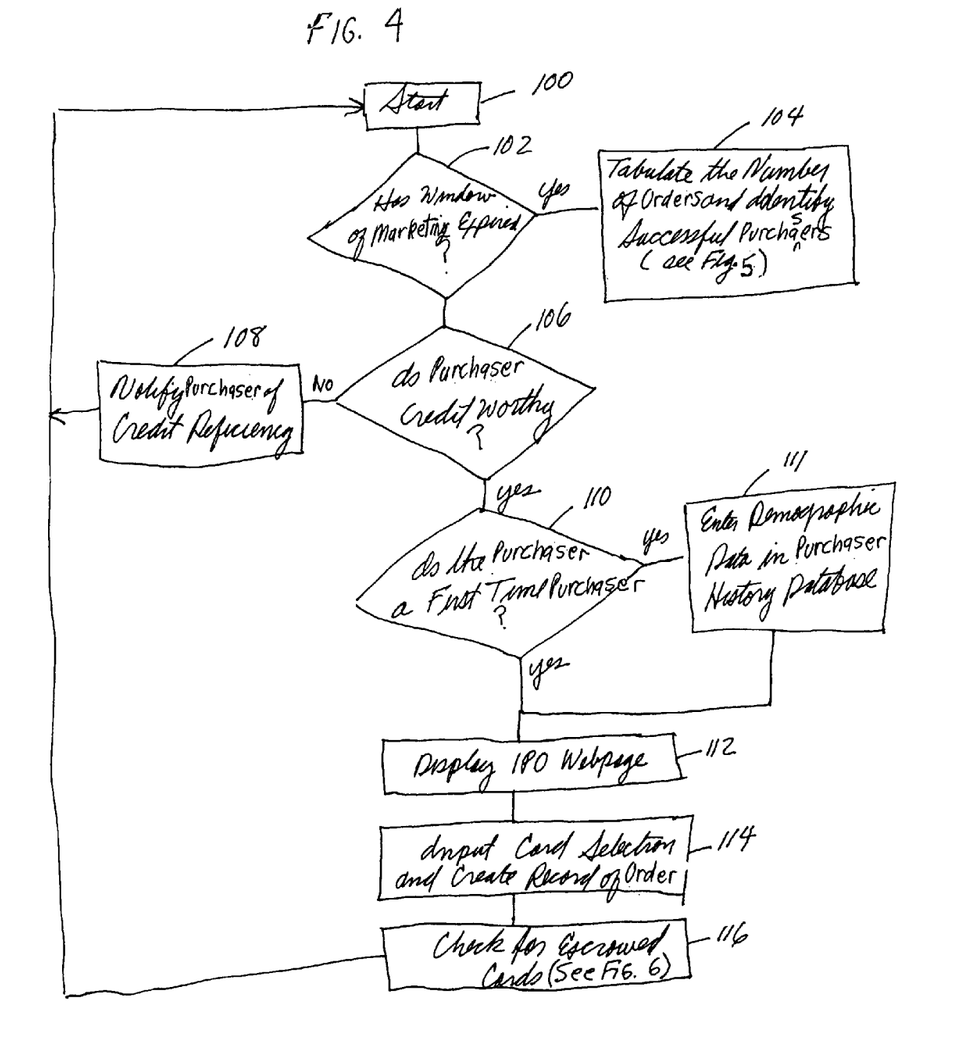
FIG. 4 is a flow diagram of a program, which is loaded on the server system, to run an offering for sale, whereby a plurality of purchasers can transmit from each of their systems orders to the server system and the placed orders processed to determine the successful purchaser(s)

Referring now to FIG. 4, there is shown a flowchart of the programming used to carry out an Initial Player Offering for sale in accordance with this invention. After returning to start in step 100, step 102 compares in a preferred embodiment of this invention the current date with the offering for sale termination date set in step 58 and, if less, indicating that the offering for sale has not terminated, the processing moves to step 106. In a further embodiment of this invention, step 102 may terminate the offering for sale not as a function of time, but rather as a function of the number of orders received that may exceed a preset maximum number; in other words, when that number of orders have been received and recorded in the purchaser history database 28, as will be explained below, the Initial Player Offering for sale will be terminated. Then step 106 communicates with the purchaser's bank to determine the status of the purchaser's credit card account. If credit worthy, the program continues with the steps 110, 112 and 114. If the purchaser is not credit worthy, step 108 transmits a message via the link 20 to the originating purchaser system 10 to inform this purchaser that his/her order for has been denied for credit reasons. In step 110, a purchaser history is built in the database 28, one purchaser at a time. As shown in FIG. 4, an account is established for each credit worthy purchaser. In particular, step 110 examines the purchaser history database 28 to determine whether the present purchaser has made a previous order and whether the demographic data for the present purchaser is already stored in the database 28. If the demographic data for this particular purchaser is not present indicating that this is a first time purchaser, step 111 then enters in the purchaser history database 28 that demographic information about the purchaser as was entered in step 106. In a preferred embodiment of this invention, the purchaser is requested upon first placing in step 100 an order to this server system 22 to provide certain demographic information about himself/herself, e.g., home and business addresses and telephone numbers, email address, and the account number of the credit card that the purchaser intends to use as his/her method of payment for the cards 40 sought to be purchased in this offering for sale. The purchaser history retained in database 28 as shown in FIG. 1 further includes data as to orders that are submitted during the offerings for sale, and further data as to the cards 40 that the purchaser has escrowed. This data will be entered later in the processing as will be explained below.

After the purchaser's account has been set up in steps 110 and 111, step 112 downloads the webpage 24a from the database 25 via the link 20 to the purchaser system 10 which originated the order. At this purchaser system 10, the downloaded webpage 24a is presented on the display 16. In step 114, the purchaser selects one of the cards 40a, b or c to order and clicks on the button 42 corresponding to the desired card 40, e.g., the purchaser actuates button 42b to order the Derek Jeter card 40b. Step 114 also prompts the purchaser to enter the amount of his/her order for on the data input device 18. Step 114 then enters data that identifies the selected card 42 and the amount of the order into the purchaser's account that was established in step 110. Next step 116 checks the purchaser history database 28 to determine whether the current purchaser holds escrowed cards 40 and, if so, offers the primary purchaser the opportunity to sell the escrowed cards 40 on a secondary market as will be explained below in greater detail with respect to FIG. 6. After step 116 has been completed, the program returns to start 100 to wait for the next order to be received by the server system 22.

Figure 5:
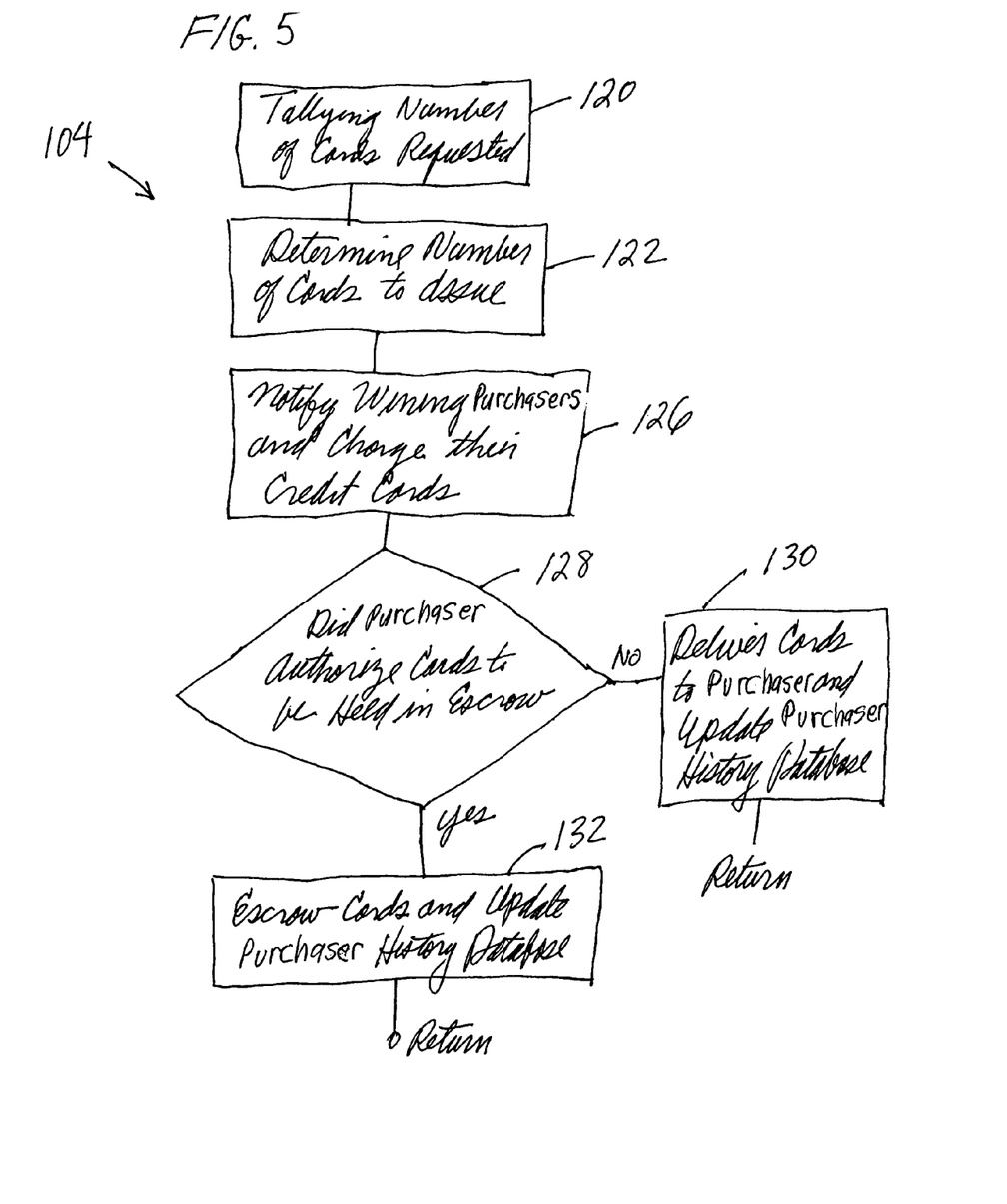
FIG. 5 is a flow diagram of a program, which is loaded on the server system, to control the construction of a purchaser's history database at the server system, whereby a record of the orders made in the course of one or more offerings for sale and the collectibles so purchased is built.

If step 102 of FIG. 4 determines that the Initial Player Offering for sale has been completed, step 120 as shown in FIG. 5 tabulates the number of the cards 40 upon which orders were placed and then in step 122 identifies the successful orders. In a preferred embodiment, step 122 determines whether the initial offering was oversubscribed, i.e., more cards 40 were ordered than the maximum number of cards available to the Initial Player Offering for sale. If oversubscribed, cards 40 will be allocated based on: 1) the number of the cards offered, 2) which of the purchasers placed their orders first, and 3) the prior history of the purchases of the purchasers, i.e., the purchasers who had purchased the most collectibles 40 in past auctions would be awarded more cards 40 in the present Initial Player Offering for sale. After the successful purchasers are identified, notices are transmitted in step 126, typically via the Internet, to each of the successful purchasers informing them that they had winning orders and the number of cards 40 allocated to each. In addition, step 126 causes a charge to be made against the credit card accounts of the successful purchasers for the amount of the purchased cards 40 and further to impose charges for shipping and handling, as well as a commission for the purchasing administrator.

Further, these notices also inform the purchasers of their options to have the awarded cards 40 sent to them or, at their choice, to escrow the purchased cards 40 with the purchasing administrator or another escrow agent. If the purchaser elects in step 128 to take delivery of the cards 40, the cards 40 will be forwarded in step 130, for example, in a sealed case with an authentication sticker adhered to the case. Further, step 130 may update the purchaser history database 28 that the cards 40 have been delivered to the purchaser. The case will be tamper-evident (not necessarily tamper proof) to provide an indication of whether or not the cards 40 had been handled and thus a possible indication of their condition. As is well known to trading card purchasers, the value of a trading card 40 is highly dependent on its condition. If it was apparent that the case was still in tact, then there is a strong indication that the cards 40 are in "mint" conation and, therefore, can command a premium price.

If the purchaser elects to have the cards 40 escrowed, step 132 takes the appropriate steps to place the purchased cards in escrow. In particular, step 132 updates the purchaser history database 28 and, in particular, enters to that purchaser's account the number of cards 40 held in escrow. Further information, such as the purchase price of the escrowed cards 40, may also be entered in the database 28. The escrowed cards 40 are stored in a benign environment to protect the condition of the cards. If the offering sale administrator holds the cards 40, the administrator will be able to "guarantee" the condition of the cards 40. The ability to guarantee the card condition would provide a significant benefit to offering for sale cards 40 over the Internet. By comparison, some well-known purchasing administrators merely act a broker between a buyer and a seller, and normally will not take responsibility for the transaction, much less the condition of the purchased goods. Thus after the cards 40 have appreciated over a period of time, the offering sale administrator can still guarantee the condition of the escrowed cards 40, and the purchaser who now seeks to sell the appreciated cards 40 as well as potential new purchasers can have reasonable confidence in the card condition, as well as the administrator's guarantee.

Figure 6:
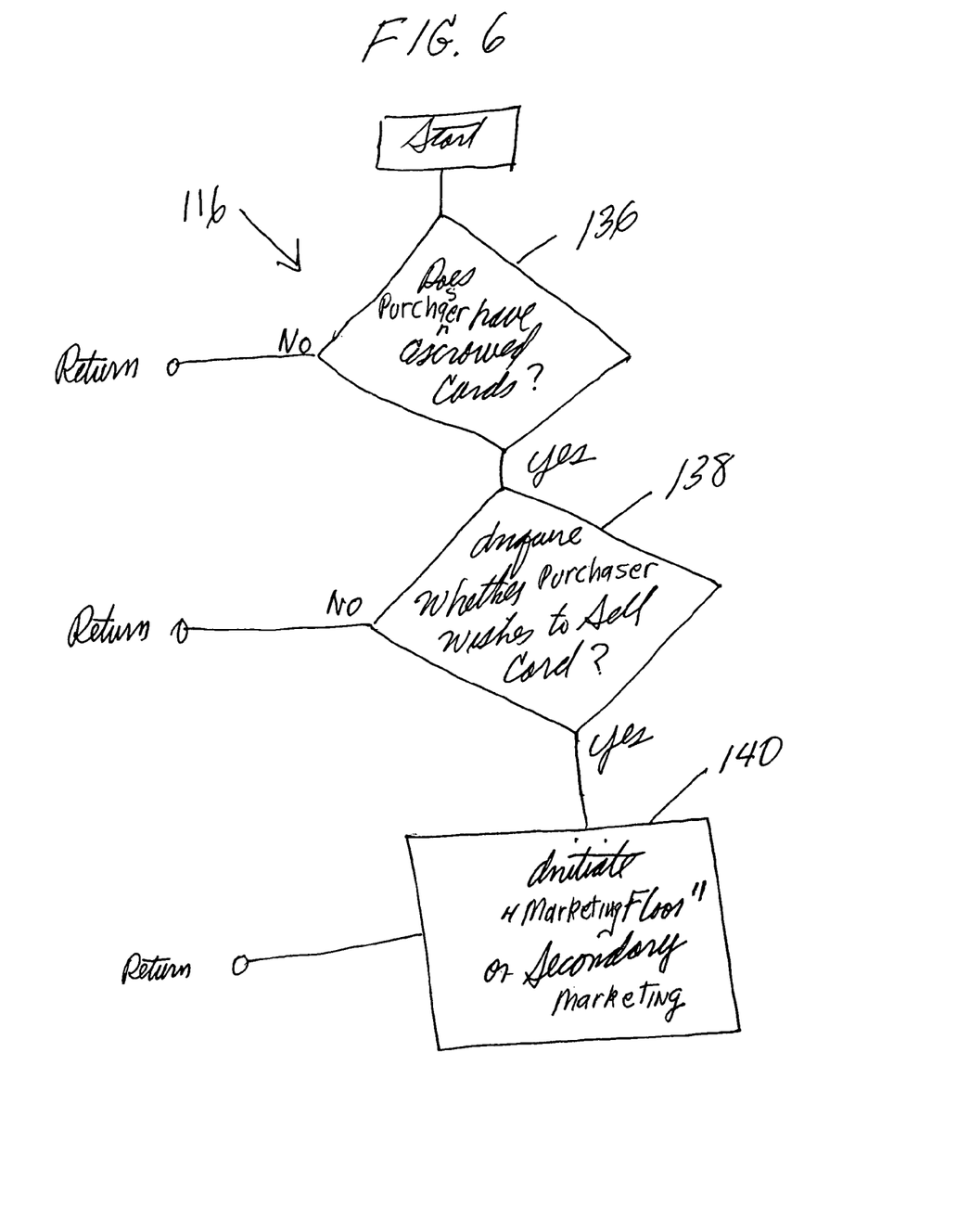
FIG. 6 is a more detailed flow diagram than that of FIG. 5 of a program, which is executed on the server system to tally the number of orders for each of the collectibles offered for sale and to determine the successful purchaser(s) for each of the collectibles.

Referring now to FIG. 6, step 116 for querying a purchaser as to whether he/she has retained cards 40 in escrow with the purchasing administrator is explained in greater detail. First in step 136, the program accesses the purchaser history database 28 to determine whether the present purchaser has previously escrowed card(s) 40. If card(s) 40 have not been escrowed, the program returns. If the purchaser has escrowed card(s) 40, step 138 downloads a webpage 24 (not shown) to ask this purchaser whether he/she wishes to sell any of his escrowed cards, whereby the purchaser clicks on the appropriate web buttons (not shown) to answer yes or no. If no, the programming makes a return at this time. If yes, step 140 initiates the offering for sale of the escrowed cards 40, which is the nature of an auction as will be explained below with respect to FIG. 7.

The sale of an escrowed card 40 can also be initiated by a purchaser who can directly access from his/her station 10 the purchaser history database 28 and to view on a display 16 the record of his/her account that includes the number of escrowed cards 40. After initiating a resale of the escrowed cards 40 in a start step 140 (either from step 90 shown in FIG. 6 or directly by the purchaser from his/her purchaser station 10), step 141 downloads a webpage 24 (not shown) bearing a form to be completed by the primary purchaser, now the card holder and seller, authorizing the purchasing administrator to resell his/her escrowed cards 40 on a secondary market in the form of a "trading floor" or secondary offering for sale to be described below. After the authorization form has been completed and transmitted by the seller back over the links 20 to server system 22, step 142 determines whether the window of time, e.g., 7 days, available for a "trading floor" offering sale has terminated. If this offering for sale is still running, the secondary purchasers (not to be confused with the primary purchasers referred to above who are now the sellers) may transmit their orders from their purchaser stations 10 to the server system 22. Next step 144 checks the credit of the secondary purchasers in a manner similar to that carried out by step 106 of FIG. 4. If the credit of the secondary purchaser is not worthy, step 146 notifies this purchaser that his/her bid for has not been accepted for credit reasons. If the secondary purchaser's credit is acceptable, step 148 downloads the webpage 24b from it database 25 over the link 20 to the originating purchaser station 10, whereat the webpage 24b is presented on the system's display 16. If the secondary purchaser wants to make a bid, he/she enters a bid in the block 44. In step 156, this bid is received and processed, i.e., the bid is entered into a list of orders held in the purchasers history database 28 for later processing as will be described. Next, step 158 determines whether the current order is a "Take It" bid which the seller has initially indicated would be accepted. If such a bid, the offering for sale is immediately terminated and the processing moves to steps 162, 164 and 166 which will be explained below. If the current bid is not a "Take It" bid, the processing returns to the start step 140 to await the placing of the next bid in the "trading floor" offering for sale.

Figure 7:
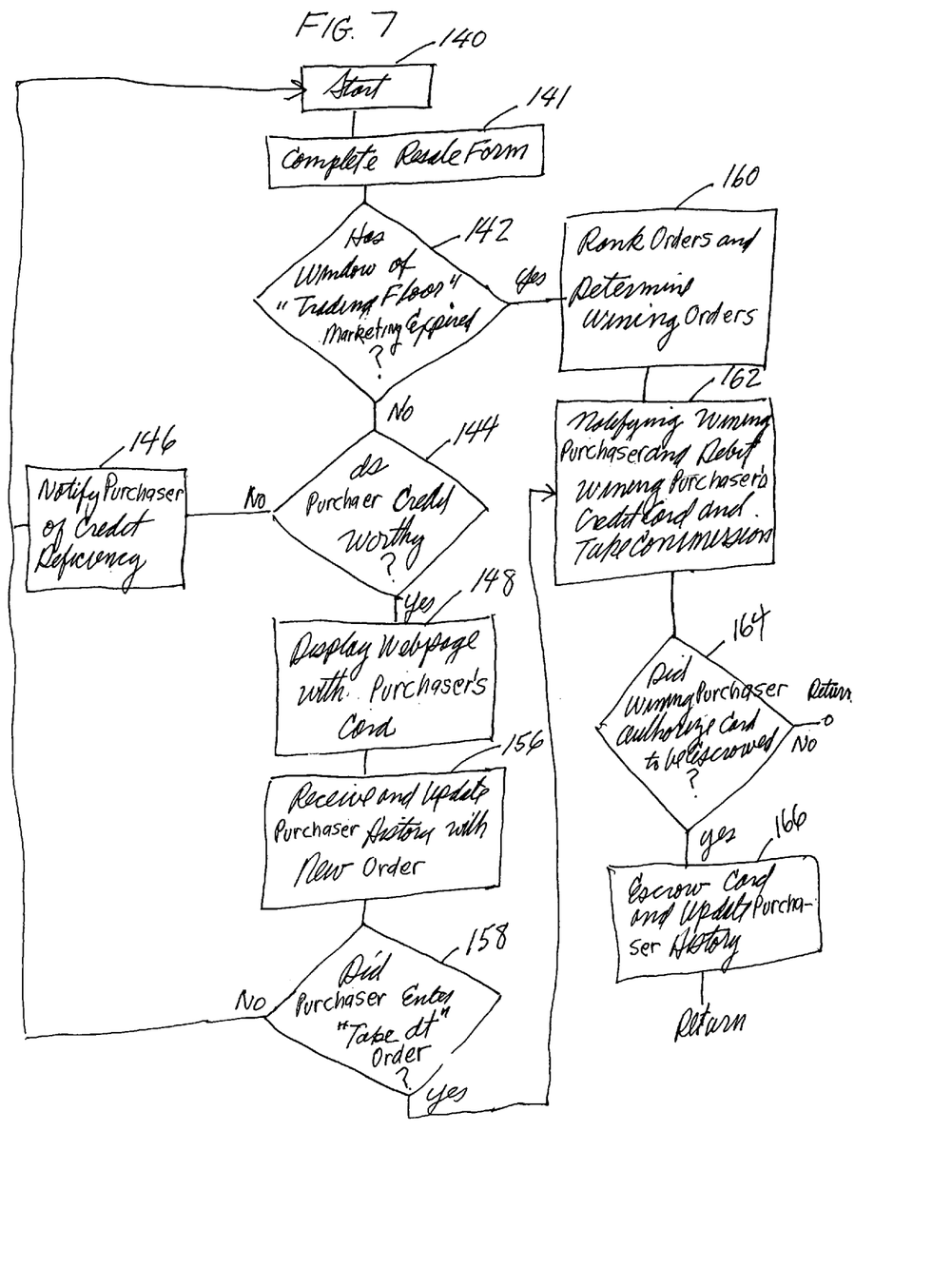
FIG. 7 is a detailed flow diagram that describes a process of offering selected collectibles in a secondary or resale market.

Still referring to FIG. 7, if step 142 determines that the "trading floor" offering for sale has expired, step 160 accesses the list of bids received in the course of this "trading floor" offering for sale as stored in the purchasers history database 28. Then, step 160 ranks the bids by the amount of the order and determines the successful or winning order as that order which offers the highest amount. If there are ties as to the amount, the earliest order is deemed the winner. Next, step 162 forwards a notice over the Internet to the winning bidder notifying that bidder that he/she has purchased the auctioned card 40. Also, step 162 charges the credit card account of the winning bidder with its amount equal to his/her order plus a suitable service and handling charge, as well as an appropriate commission for the purchasing administrator. Next, step 164 determines whether the winning secondary market bidder would authorize the offering sale administrator to escrow the purchased card 40 in an account for the secondary bidder.

If the secondary bidder declines, the program returns. If the secondary bidder decides to escrow his/her cards 40, step 166 takes appropriate action to escrow this card 40 and to update the account of the secondary purchaser and the seller/primary purchaser in the purchaser history database 28. In effect, the purchasing administrator transfers the ownership of the auctioned card 40 from the seller/primary purchaser to the secondary bidder. In particular, the step 166 deletes the purchased card 40 from the seller/primary purchaser's account in the purchasers history database 28 and adds that card to the account of the winning secondary bidder. In a preferred embodiment, the purchase price of the purchased card 40 is also noted in the account of the secondary purchaser. After step 166, the programming returns.

The escrowing feature of this invention is of particular importance to the primary purchaser as he/she attempts to make a sale on the secondary market. If the purchasing administrator has escrowed the cards to be offered for sale on the secondary market, the purchasing administrator can guarantee the condition of these cards 40 since they have continuously been under the control of the administrator, and the secondary bidder is assured of the condition of the card 40 that he/she will be purchasing on. It is this secondary bidder confidence that will drive the secondary market. Even if the primary purchaser takes possession of the cards 40 immediately after the Initial Player Offering for sale, he/she can still sell on a secondary market with a different purchasing administrator or the same one who originally sold the card 40 to him/her. If the primary purchaser/seller doesn't break the package protecting the cards 40 that he/she purchased, the seller may represent to the secondary bidder what condition the cards 40 are in that are being offered for sale, without the secondary bidder having to go to a third party rating service such as PSA.

Although the present invention has been described in terms of various embodiments, it is not intended that the invention be limited to these embodiments. Modification within the spirit of the inventions will be apparent to those skilled in the art. For example, though the collectibles of a preferred embodiment of this invention are described as trading cards and, in particular, trading cards bearing data and the images of athletes, a wide range of collectibles that do not have a readily established primary market may be so offered for sale without departing from the teachings of this invention. Though a preferred embodiment of this invention is implemented as a web site on the Internet, this invention may be implemented on other communication systems, e.g., telephone lines and other wide area and local area networks, within the scope of this invention. It will be appreciated that though the processing of this invention has been programmed in accordance with the attached flowcharts, it would be apparent to one skilled in the computer programming arts, that other programs may be substituted for the attached flowcharts without departing from the teachings of this invention. Though the offering for sale of the primary market as taught herein may be carried out in the broadest aspects of this invention at any time, it is contemplated within the scope of this invention that the primary offering for sale may be carried out on the occurrence of special events, e.g., a pitcher throwing a no-hitter, an athlete breaking a record, the trade of an athlete from one team to another, and the drafting by a professional athletic team of a promising young player. Any of these events could trigger the issuance of a new trading card and its Initial Player Offering for sale on the primary market. Though the preferred embodiment markets on the primary market units of collectibles in terms of a number of like trading cards, it is contemplated within the teachings of this invention to market one card at a time or to market a lot having a number different cards therein; such offering for sale would be in the nature of mutual funds, whereby a fund manager exercises his/her judgement to pick a number of different cards to thereby distribute the risk of such an investment. Though the above offering for sale on the secondary market is described in the nature of an offering for sale, it is contemplated that a sale of a particular security could be carried out in real time, wherein both offers to sell and to buy are posted on an exchange under the heading of this item. If there is a match between the posted offers, then the sale is consummated. The scope of the present invention is defined by the claims that follow.

We claim:

1. A method of facilitating an issuer of collectibles to manage an offering of collectibles for sale, each of the collectibles having a predetermined condition, said method comprising the steps of:
    a) initially offering for sale the collectibles to potential purchasers for a period of time set by the issuer;
    b) receiving orders from the ordering potential purchasers;
    c) allocating the offered collectibles among selected of the ordering potential purchasers;
    d) facilitating steps a), b) and c) by a programmed computer; and
    e) maintaining the condition of the collectibles during steps a), b) and c), whereby the allocated collectibles are of the predetermined condition and the issuer may guarantee the condition of the allocated collectibles,
    wherein step b) offers an initial offering of collectibles, and there is further included the step of offering for sale selected of the allocated collectibles on a secondary market at the direction of the purchasers of the allocated collectibles.

2. A method of facilitating an issuer of collectibles to manage an offering of collectibles for sale, each of the collectibles having a predetermined condition, said method comprising the steps of:
    a) initially offering for sale the collectibles to potential purchasers for a period of time set by the issuer;
    b) receiving orders from the ordering potential purchasers;
    c) allocating the offered collectibles among selected of the ordering potential purchasers;
    d) facilitating steps a), b) and c) by a programmed computer;
    e) maintaining the condition of the collectibles during steps a), b) and c), whereby the allocated collectibles are of the predetermined condition and the issuer may guarantee the condition of the allocated collectibles; and
    f) determining whether the number of ordered collectibles exceeds the predetermined number of offered collectibles and, if so, allocating the predetermined number of offered collectibles among the ordering purchasers,
    wherein if said total number of collectibles exceed the predetermined number of collectibles, said step of allocating reduces the number of collectibles to be allocated to selected of the ordering purchasers in accordance with a predefined algorithm.

3. The method of managing an initial offering for collectibles as claimed in claim 2, wherein there is further included a step of maintaining a record of the purchasing activity of each purchaser, said algorithm allocating the number of collectibles to a certain purchaser as a direct function of the magnitude of said purchasing activity of the certain purchaser.

4. A method of facilitating an issuer of collectibles to manage an offering of collectibles for sale, each of the collectibles having a predetermined condition, said method comprising the steps of:
    a) initially offering for sale the collectibles to potential purchasers for a period of time set by the issuer;
    b) receiving orders from the ordering potential purchasers;
    c) allocating the offered collectibles among selected of the ordering potential purchasers;
    d) facilitating steps a), b) and c) by a programmed computer;
    e) maintaining the condition of the collectibles during steps a), b) and c), whereby the allocated collectibles are of the predetermined condition and the issuer may guarantee the condition of the allocated collectibles;
    f) determining whether the number of ordered collectibles exceeds the predetermined number of offered collectibles and, if so, allocating the predetermined number of offered collectibles among the ordering purchasers; and
    g) providing lots of the collectibles for offering for sale.

5. The method of managing an initial offering of collectibles as claimed in claim 4, wherein there is further provided the step of providing collectibles of different kinds, and assembling the collectibles into lots such that each lot of the collectibles are of the same kind.

6. A method of facilitating an issuer of collectibles to manage an offering of collectibles for sale, each of the collectibles having a predetermined condition, said method comprising the steps of:
    a) initially offering for sale the collectibles to potential purchasers for a period of time set by the issuer;
    b) receiving orders from the ordering potential purchasers;
    c) allocating the offered collectibles among selected of the ordering potential purchasers;
    d) facilitating steps a), b) and c) by a programmed computer;
    e) maintaining the condition of the collectibles during steps a), b) and c), whereby the allocated collectibles are of the predetermined condition and the issuer may guarantee the condition of the allocated collectibles;
    f) determining whether the number of ordered collectibles exceeds the predetermined number of offered collectibles and, if so, allocating the predetermined number of offered collectibles among the ordering purchasers;
    g) providing a purchaser history database for keeping a record of each purchaser that has placed an order in the course of said initial offering of the collectibles for sale and
    h) updating data indicative of each collectible held in escrow in that record of the purchaser holding the escrowed collectible.

7. A method of facilitating an issuer of collectibles to manage an offering of collectibles for sale, each of the collectibles having a predetermined condition, said method comprising the steps of:
    a) initially offering for sale the collectibles to potential purchasers for a period of time set by the issuer;
    b) receiving orders from the ordering potential purchasers;
    c) allocating the offered collectibles among selected of the ordering potential purchasers;
    d) facilitating steps a), b) and c) by a programmed computer;
    e) maintaining the condition of the collectibles during steps a), b) and c), whereby the allocated collectibles are of the predetermined condition and the issuer may guarantee the condition of the allocated collectibles;

f) determining whether the number of ordered collectibles exceeds the predetermined number of offered collectibles and if so, allocating the predetermined number of offered collectibles among the ordering purchasers; and g) providing a purchaser history database for keeping a record for each purchaser that has placed an order in the course of said initial offering of the collectibles for sale; and h) updating for each order received data indicative of said number of collectibles in that record of the purchaser placing that order.

8. A method of operating a server to receive over a network at least one order for collectibles from at least one of a plurality of potential purchasers, said server being programmed to implement said method comprising the steps of:

a) providing at the server a purchaser history database;

b) offering for sale an initial placement of a predetermined number of collectibles;

c) receiving from one of the potential purchasers at least one order for a selected number of collectibles;

d) creating in response to the received one order an account in the purchaser history database for its potential purchaser, each account including a record of the purchasing activity of its potential purchaser; and e) making a second offering for sale at the direction of at least one purchaser of selected of allocated collectibles on a secondary market.

9. The method of operating a server as claimed in claim 8, wherein there is further included the steps of receiving orders from at least one purchaser who placed an order during said second offering for sale on said secondary market, and updating the purchaser's record for each received order that reflects the ordering activity of the purchaser.

10. The method of operating a server as claimed in 9, wherein said ordering activity includes receiving a number of said received orders, and there is included a step of incrementing the number of orders in response to the receipt of each order.

11. A method of operating a server to receive over a network at least one order for collectibles from at least one of a plurality of potential purchasers, said server being programmed to implement said method comprising the steps of:

a) providing at the server a purchaser history database;

b) offering for sale an initial placement of a predetermined number of collectibles;

c) receiving from one of the potential purchasers at least one order for a selected number of collectibles;

d) creating in response to the received one order an account in the purchaser history database for its potential purchaser, each account including a record of the purchasing activity of its potential purchaser;

e) updating the record of the purchaser who made at least one order in the first mentioned offering with data indicative of the purchaser's allocated collectible(s);

f) receiving bids from purchasers for selected of said collectibles during a second offering for sale on said secondary market; and g) determining the winning bids on each collectible purchased on said secondary market and updating the record(s) of the purchaser(s) having winning bid(s) with data indicative of said purchased collectible(s).

12. A method of managing an initial offering of collectibles for sale, said method carried out on a programmed computer to effect the following steps:

a) communicating an initial offering for sale to purchasers of a predetermined number of the collectibles for a predetermined period of time commencing at a certain time;

b) receiving orders from the ordering purchasers, each order indicating the numbers of collectibles ordered by its purchaser;

c) counting the number of collectibles for which orders have been received to provide a total number of ordered collectibles; and d) comparing said total number of counted collectibles with said predetermined number of collectibles;

e) determining whether the number of ordered collectibles exceeds the predetermined number of offered collectibles and, if so, allocating the predetermined number of offered collectibles among the ordering purchasers by reducing the number of collectibles to be allocated to selected of the ordering purchasers in accordance with a predefined algorithm; and f) said predefined algorithm increases the number of collectibles to be allocated to a certain purchaser as an inverse function of the period of time occurring between said certain time and the time when an order was received from said certain purchaser.

13. A server designed to support an initial offering by an issuer of collectibles of a limited number of the collectibles via a plurality of remote terminals, each remote terminal operable by a potential purchaser to transmit over a network to said server at least one order for the purchase of collectibles being offered for sale, each of the collectibles having an uncirculated condition, said server having a memory and being programmed to:

a) store in said memory an indication of the predetermined condition of each of, the price of each of and the limited number of the collectibles;

b) transmit to the plurality of remote terminals at least one offer for sale of the limited number of collectibles, the one offer having an indication of the predetermined condition of the one collectible, whereby at least first and second potential purchasers are enabled to actuate its remote terminal to transmit at least first and second orders for the one collectible to said server; and c) process the transmitted first and second orders to allocate at least one of the limited number of collectibles among selected of the first and second potential purchasers and create for the successful purchaser of the one collectible a record in said memory for the collectibles allocated to the successful purchaser.

14. The server as claimed in claim 13, wherein the collectibles comprise trading cards.

15. The server as claimed in claim 13, wherein each of the collectibles with the condition comprises a trading card in mint condition.

16. The server as claimed in claim 13, wherein each of the collectibles with the condition comprises uncirculated trading cards.

17. The server as claimed in claim 13, wherein said server is programmed to respond to each order received from one of the purchasers to update said record of the one purchaser.

18. The server as claimed in claim 17, wherein said server engine updates said records of said purchaser with data indicative of the collectibles allocated during the initial placement.

19. The server as claimed in claim 18, wherein said server engine is programmed to respond to messages from certain of the purchasers to place in escrow selected of their collectibles that were allocated during the initial placement, by updating said records of said certain purchasers with data indicative of the collectibles held in escrow.

20. A method of offering for sale collectibles of a predetermined condition on a primary market and on a secondary market, said method comprising the steps of:
   a) offering for sale to one or more prospective purchasers an initial placement of one or more selected collectibles on the primary market;
   b) receiving orders from prospective purchasers on selected of the collectibles and allocating the one or more selected collectibles to one or more of the successful purchasers;
   c) offering for sale at the direction of the one successful purchaser selected of the allocated collectibles on a secondary market; and
   d) maintaining the predetermined condition of the collectibles during steps a), b) and c), whereby the allocated collectibles are of the predetermined condition; and
   e) facilitating at least steps a), b) and c) by a programmed computer.

21. The method of offering for sale collectibles as claimed in claim 20, further including the step of limiting the number of collectibles of one kind to be offered for sale on the primary market.

22. The method of offering for sale collectibles as claimed in claim 20, wherein the collectibles comprise trading cards.

23. The method of offering for sale collectibles as claimed in claim 20, wherein said offering for sale on the primary market is carried out for a selected, predetermined period of time.

24. The method of offering for sale collectibles as claimed in claim 20, further including the step of predetermining said number of collectibles to be offered for sale on the primary market before said step a) of offering for sale on said primary market begins.

25. The method of offering for sale collectibles as claimed in claim 24, wherein said step of allocating counts the number of collectibles for which orders have been placed.

26. The method of offering for sale collectibles as claimed in claim 25, wherein said step of allocating further compares said number of counted collectibles with said predetermined number of collectibles.

27. The method of offering for sale collectibles as claimed in claim 26, wherein if said counted number of collectibles exceeds said predetermined number of collectibles, said step of allocating reduces the number of collectibles to be allocated in accordance with a predefined algorithm.

28. The method of offering for sale collectibles as claimed in claim 27, wherein there is further included a step of maintaining a record of the purchasing activity of each purchaser, said algorithm allocating the number of collectibles to one or more purchasers as a direct function of said purchasing activity of the one purchaser.

29. The method of offering for sale collectibles as claimed in claim 20, wherein there is further included the step of providing lots of the collectibles for offering for sale on the primary market.

30. The method of offering for sale collectibles as claimed in claim 29, wherein there is further provided the step of providing collectibles of different kinds, and assembling the collectibles into lots such that each lot of the collectibles are of the same kind.

31. The method of offering for sale collectibles as claimed in claim 20, wherein there is further provided the step of enabling the one successful purchaser of collectibles on the primary market to elect to have an offering for sale or to facilitate an administrator to hold its purchased collectibles in escrow.

32. The method of offering for sale collectibles as claimed in claim 31, wherein the administrator holds the purchased collectibles of the successful purchasers in a benign environment.

33. The method of offering for sale collectibles as claimed in claim 31, wherein the one successful purchaser elects to offer for sale its purchased collectibles on the secondary market.

34. The method of offering for sale collectibles as claimed in claim 31, wherein the enabling step enables the one successful purchaser to request the administrator to deliver the purchased collectibles to the corresponding one successful purchaser.

35. The method of offering for sale collectibles as claimed in claim 20, wherein there is further included the steps of providing a purchaser history database for keeping a record of each purchaser that has placed an order in the course of said offering for sale on said primary market, and updating data indicative of each collectible and held in escrow in that record of the purchaser holding the escrowed collectible.

36. The method of offering for sale as claimed in claim 20, wherein each of said purchaser's orders received in step b) includes a number of the collectibles wanted by the purchaser.

37. The method of offering for sale as claimed in claim 20, wherein there is further included the step of predefining the number of collectibles before carrying out said step of offering for sale on the primary market.

38. The method of offering for sale as claimed in claim 37, wherein there is further included the step of providing a purchaser history database for keeping a record for each purchaser that has placed an order in the course of said offering for sale on the primary market, and updating for each order data indicative of said number of collectibles in that record of the purchaser placing that order.

39. A method of facilitating an issuer of collectibles to manage an initial offering for the sale of a limited number of the collectibles of a predetermined condition, said method implemented by a computer programmed to effect the steps of:
   a) storing in a memory the determined condition of and the limited number of the collectibles;
   b) communicating to potential purchasers a message offering to sell the collectibles and specifying the determined condition and the limited number of collectibles offered for sale;
   c) receiving orders from the ordering potential purchasers; and
   d) allocating the offered collectibles among selected of the ordering potential purchasers.

40. The method of managing as claimed in claim 39, wherein there is further included the step of creating a record in the memory for each successful purchaser to which collectibles were allocated.

41. The method of managing as claimed in claim 40, wherein said creating step includes the substep of storing the determined condition of the collectibles in the record of its successful purchaser.

42. The method of managing as claimed in claim 39, wherein the collectibles comprise trading cards.

43. The method of managing as claimed in claim 39, wherein the collectibles of the predetermined condition comprise trading cards in mint condition.

44. The method of managing as claimed in claim 39, wherein the collectibles of the predetermined condition comprises uncirculated trading cards.

45. The method of facilitating an issuer of collectibles to manage the initial offering for sale of collectibles of a predetermined condition, said method comprising the steps of:
- a) offering for sale the collectibles;
- b) allocating selected of the offered collectibles to selected of a plurality of potential purchasers;
- c) creating for each of the selected purchasers a record;
- d) implementing each of said steps a), b) and c) by a programmed computer;
- e) maintaining the predetermined condition of the collectibles throughout steps a) to d);
- wherein the step c) maintains the condition of the collectibles by placing at least one of the plurality of collectibles in a protective casing that encloses and protects the condition of the one collectible;
- further including the step of maintaining the condition of the collectibles provides at least one tamper evident casing for receiving at least one collectible;
- wherein step c) further maintains the condition of the collectibles by placing a plurality of the collectibles in a benign environment;
- further including the steps of communicating to at least one of the selected purchasers a message giving the selected purchaser the choice to maintain the condition of the collectibles by placing it either in the protective casing or in the benign environment.

46. The method of managing the offering of collectibles for sale as claimed in claim 45, wherein the message gives the selected purchaser the further choice of offering for sale its allocated collectibles to other purchasers.

47. A server for facilitating an issuer of collectibles to manage an initial offering of the collectibles of a determined condition for sale, said server having a memory and being programmed to:
- a) store the determined condition of the collectibles that are offered for sale;
- b) transmit over a network from the server to selected of a plurality of potential purchaser stations an initial offering for a predetermined time of a limited number of the collectibles for sale and bearing an indication of the condition of the collectibles;
- c) allocating in response to orders transmitted to the server from the responding purchasers selected of the collectibles among selected of the responding purchasers; and
- d) creating a record in the memory for each of the selected purchasers.

48. The server for managing the offering of collectibles of a determined condition for sale as claimed in claim 47, wherein the server is further programmed to facilitate an administrator to maintain at least the limited number of collectibles in the determined condition during the offering for sale of the collectibles, and the message comprises a guarantee made by the administrator that the limited number of collectibles initially offered for sale are of the determined condition indicated by the message.

49. The server for managing the offering of collectibles of a determined condition for sale as claimed in claim 47, wherein the server is further programmed to store the number of the collectibles allocated to a selected purchaser into the record of that purchaser.

50. The server for managing the offering of the collectibles of a determined condition for sale as claimed in claim 47, wherein the server is programmed to receive and process commands from the selected purchasers to which at least one collectible was allocated to place its allocated one collectible for sale to other potential purchasers.

51. The server for managing the offering of the collectibles of a predetermined condition for sale as claimed in claim 50, wherein the server is programmed to receive a command from the one selected purchaser to which the one collectible was allocated to transmit the allocated collectible to the selected purchaser in a protective case, whereby the condition of the allocated collectible is maintained.

52. A method of managing the initial offering for sale of collectibles, the method comprising the steps of:
- a) keeping the collectibles of a predetermined condition in a protective environment;
- b) initially offering for sale to potential purchasers the collectibles on an initial market;
- c) determining the successful purchasers of the collectibles in the initial market; and
- d) provide each successful purchaser the option to remove its collectibles, in the same predetermined condition, from the protective environment or to continue to keep the collectibles in the protective environment; at least said steps b)-d) being implemented by a programmed computer.

53. The method of managing as claimed in claimed in claim 52, wherein if a successful purchaser opts to remove its collectibles, the collectibles to be removed are disposed in a protective housing.

54. A method of facilitating at least one administrator to manage the sale of at least one collectible to at least first and second purchasers on a primary market and a secondary market respectively, the method comprising the steps of:
- a) determining the condition of the one collectible;
- b) facilitating the administrator to introduce the one collectible for sale on the primary market;
- c) effecting the sale of the one collectible on the primary market to the first purchaser;
- d) facilitating the first purchaser to offer for sale the purchased one collectible on the secondary market;
- e) effecting the sale of the one collectible from the first purchaser to the second purchaser on the secondary market;
- f) implementing steps b)-e) by a programmed computer; and
- g) maintaining the condition of the one collectible throughout the primary and secondary markets, whereby the one administrator may guarantee the determined condition of the one collectible to at least the first and second purchasers.

55. The method of facilitating at least one administrator as claimed in claim 54, wherein step f) of maintaining the condition comprises the step of keeping the one collectible in a benign environment.

56. The method of facilitating at least one administrator as claimed in claim 54, wherein step f) comprises the step of encapsulating the one collectible in a protective housing.

57. The method of facilitating at least one administrator as claimed in claim 56, wherein there is a second administrator, the second administrator having a secondary market, and there is further included the step of determining whether the protective housing has been tampered with and, if not, facilitating the second administrator to offer the one collectible of the determined condition for sale on the secondary market of the second administrator.

58. The method of facilitating at least one administrator as claimed in claim 56, wherein the one administrator continues to guarantee the condition of the one collectible as long as the protective housing remains in tact.

\* \* \* \* \*

UNITED STATES PATENT AND TRADEMARK OFFICE
CERTIFICATE OF CORRECTION

PATENT NO.        : 7,797,194 B1                                 Page 1 of 1
APPLICATION NO.   : 09/488107
DATED             : September 14, 2010
INVENTOR(S)       : Warren E. Friss and Steven J. Katz It is certified that error appears in the above-identified patent and that said Letters Patent is hereby corrected as shown below:

Column 8, line 39: delete "conation" and insert -- condition --

Signed and Sealed this

Second Day of November, 2010

David J. Kappos
*Director of the United States Patent and Trademark Office*